Oct. 14, 1969   R. B. STOUGHTON   3,472,931
PERCUTANEOUS ABSORPTION WITH LOWER ALKYL AMIDES
Filed Jan. 17, 1969
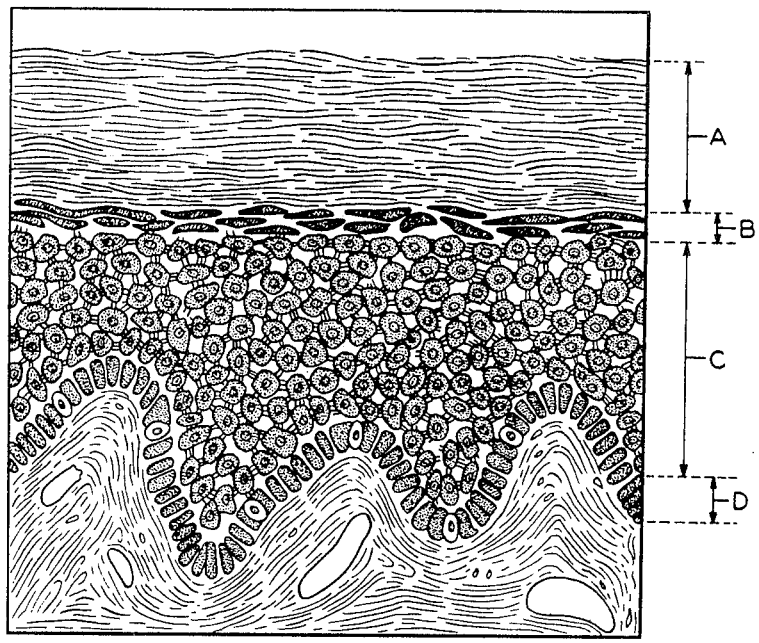
INVENTOR
RICHARD B. STOUGHTON

United States Patent Office 3,472,931
Patented Oct. 14, 1969

3,472,931
PERCUTANEOUS ABSORPTION WITH LOWER ALKYL AMIDES
Richard Bahu Stoughton, La Jolla, Calif., assignor to Foster-Milburn Company, Buffalo, N.Y., a corporation of New York
Continuation-in-part of application Ser. No. 499,330, Oct. 21, 1965. This application Jan. 17, 1969, Ser. No. 792,116
Int. Cl. A61l *23/00;* A61k *17/06, 27/00*
U.S. Cl. 424—180　　　　　　　　　　　　　17 Claims

ABSTRACT OF THE DISCLOSURE

A process and products are provided for increasing the percutaneous absorption through and retention of beneficial therapeutic compounds in the skin by the topical application to the skin of humans and domestic animals of a beneficial chemical therapeutic compound and a pharmaceutically acceptable vehicle containing a lower alkyl amide, such as N,N-dimethylacetamide (DMA), N,N-diethylacetamide, etc. From about 0.001% by weight up to about 80% by weight of the topically active therapeutic compound is employed in the composition applied topically with the pharmaceutically acceptable vehicle comprising the remainder. In accordance with a preferred embodiment the lower alkyl amide comprises between about 25% and 95% by weight of the composition applied.

Among the therapeutic agents which may be rapidly percutaneously absorbed in accordance with the process of the invention are anti-acne agents, sex hormones, antimicrobial agents, crude coal tar, antipsoriatic agents and antimetabolites.

PROCESS AND PRODUCTS

This application is a continuation-in-part of my copending application, Ser. No. 499,330, filed Oct. 21, 1965.

This invention relates to a process for increasing the absorption of beneficial chemical compounds into the skin and to novel preparations for topical application to the skin of humans and domestic animals to obtain beneficial absorption.

More particularly, this invention is directed to a process and preparations for increasing the percutaneous absorption and cutaneous retention in the stratum corneum of stable, topically active, lower alkyl-amide solubilizable chemical compounds.

The epithelial layer of human skin, also referred to as the epidermis, protects the more delicate underlying portions of the human body from chemical irritation, bacterial attack and other various harmful external conditions. The outer or surface division of the epidermis, called the stratum corneum or horny layer, acts as the barrier to penetration of external substances into the body. While it is essential to human health that this relatively impermeable barrier be maintained as such, instances arise where an increase in skin penetration by a selected chemical compound is highly desirable, as for example in the treatment of subcutaneous inflammation.

Various methods for increasing the permeability of the skin have been disclosed. Increased penetration of the epidermis has been achieved by occlusion of the skin with metal guards or plastic wraps. Temperature increases have enhanced the absorption of oxygen and methyl salicylate. Increases in skin temperature and the relative humidity of the adjacent atmosphere have resulted in increased penetration of water vapor and other substances through the skin. Hydration of the skin through water soaking, for example, has resulted in as high as a twelve fold increase in pentration.

While it is not known why the stratum corneum or horny layer acts as such an effective barrier it could be said as a general rule, until now, that the vehicle in which a given chemical compound was dissolved or solubilized in had little or no effect on the skin penetration rate of the compound.

It is an object of the present invention to provide a process for selectively increasing the permeability of human and animal skin to certain stable, topically active chemical compounds. A further object is to provide a process whereby increased quantities of selected stable, topically active chemical compounds can be held in the stratum corneum or horny layer of skin. Another object of the present invention is to provide novel, stable, topically-active preparations which will exhibit increased absorption through and retention in skin.

Other objects will become readily apparent to those skilled in the art from the following description and claims.

The objects of this invention are accomplished by a process comprising, contacting skin with a stable, topically active chemical compound in the presence of a vehicle having as one component a compound having the structural formula:

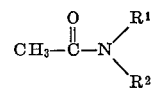

wherein $R^1$ is a member of the group consisting of hydrogen and alkyl radicals containing not more than 2 carbon atoms and $R^2$ is an alkyl radical containing not more than 2 carbon atoms. Illustrative of the amides which may be utilized in the process of this invention are N-ethyl acetamide, N,N-diethyl acetamide, N,N-dimethyl acetamide and N-methyl acetamide. The preferred amides are N,N-dimethyl acetamide (DMA) and N,N-diethyl acetamide (DEA). The most preferred amide is N,N-dimethyl acetamide.

More specifically, the objects of the present invention are effectuated by a process comprising, solubilizing a stable, topically active chemical compound in an amide as defined above and applying the solubilized, stable topically active chemical compound to the skin.

A preferred embodiment of this invention is directed to a process which comprises, solubilizing from about 0.001% by weight to about 80% by weight of a topically active chemical compound in from about 99.999% by weight to about 20% by weight of a pharmaceutically acceptable vehicle containing as a component about 20% by weight of N,N-dimethyl acetamide, and contacting skin with the solubilized stable, topically active chemical compounds for about 15 seconds.

The accompanying drawing is presented to facilitate an understanding of the invention. The drawing is a diagrammatic illustration of a cross sectional view of the anatomy of epidermis, highly magnified. The stratum corneum (A) is the outer division of the epidermis composed of dead eipthelial cells and referred to generally hereinafter as the horny layer. All the barrier properties of the skin, i.e., resistance to penetration, exist in the cellular layer identified as A in the drawing.

Once a chemical substance passes through the horny layer of the epidermis absorption or penetration through the remaining stratum granulosum (B), stratum malpighii (C) and stratum germinativum (D) on into the first connective tissue beneath the epidermis, the dermis, and remainder of the body is practically quantitative. Below the cellular layer identified as A there is very little resistance to penetration or absorption. Thus the term percutaneous absorption means that a substance passes from the top of the skin through the horny layer of the epidermis, area A of the drawing, into the cellular epidermis and from there into the corium or dermis. Once the substance has penetrated through the horny layer this then constitutes percutaneous absorption for the purposes of this invention. The passage of the substance on into the corium and into the systemic circulation is considered to be the effect or continuing result of percutaneous absorption. Absorption into the horny layer alone with no immediate further absorption or penetration deeper into the epidermis is not considered to be percutaneous absorption but is referred to rather as retention.

The term retention, then refers to absorption of substances into the horny layer alone without further continous passage into the layers identified as B, C, D and beyond. Thus the horny layer presents a depot or reservoir for topically applied substance. It should be understood, of course, that over a period of time, there may be a slow rate of absorption of the substance originally retained in the horny layer so that neither the concept of percutaneous absorption nor retention and reservoir build up is absolute but are interrelated relative terms used to describe the process of skin penetration.

In nature, when a penetratable substance is applied to the skin, an extremely small percentage of the substance is absorbed into the horny layer and retained there. An even smaller percentage of the substance absorbed into the horny layer passes through the horny layer into the layers identified as B, C and D and thence on into the systemic circulation of the human. Thus, there is both natural retention and percutaneous absorption.

The instant invention provides a process whereby this natural rate of percutaneous absorption and retention and the amount of penetratable substance actually absorbed is surprisingly and markedly increased many-fold.

The substances referred to herein as stable, topically active chemical compounds are beneficial chemical substances which can be applied topically to the skin for the purpose of medicating surface or subsurface diseases or systemic disturbances or creating skin conditions helpful in alleviating harmful or annoying external factors.

These topically active chemical compounds are stable when solubilized in the class of amides set forth above. This does not mean that these compounds must have long periods of shelf life, when incorporated in the application medium, as is generally understood concerning stability in the pharmaceutical industry. Rather for the purposes of this specification by stability is meant that the compounds will not react readily or otherwise become unstable within the short time period necessary to solubilize the compounds in the amide preparations and apply the preparations to the skin.

By the term "solubilized" is meant that the stable, topically-active compounds of this invention must have the ability to be dissolved or held in suspension by normal mixing or shaking operations in the operable class of amides set forth above, to the extent of about 0.001% by weight of stable, topically active compound in the amide.

Generally speaking many chemicals are useful in treating surface and subsurface conditions by topical application and can be made more effective if both their percutaneous absorption and retention rates are increased such that greater concentrations of the chemical will penetrate through the horny layer and also be retained in the horny layer.

Antimicrobial agents, anti-acne agents, anti-seborrheic agents, antipsoriatic agents, anticholinergics, antimetabolites, sex hormones, emollients, derivatives, extracts and components of crude coal tar and sunscreens are examples of classes of beneficial chemical compounds which, because of the manner in which they are used in topical application, exhibit enhanced results or activity due to increases in the amount of substance and the rate at which the substance is percutaneously absorbed or retained.

Anti-inflammatory agents such as triamcinolone acetonide, fluocinolone acetonide, betamethasone valerate and hydrocortisone are stable, topically active compounds which exhibit the required characteristics and are rendered more effective in treating inflammatory disorders of the skin and subsurface areas of the body by increasing their percutaneous absorption and retention. The instant process renders these compounds five to fifteen times more penetratable and since greater amounts of the steroids are available at the inflamed areas, vasoconstriction of the blood vessels is greater with accompanying reduction in swilling and less entrance of lymph and white blood cells into the affected area.

Anticholinergic drugs when introduced into the skin are capable of inhibiting sweating. Thus they have been found effective in the control of miliaria rubra (prickly heat). Actually, ordinary topical application of these drugs alone or in vehicles other than those utilized in the instant inventive process will give a certain small amount of axillary sweat inhibition which is not generally satisfactory. Experimental data shows that 1-methyl-3-pyrrolidyl $\alpha$-phenylcyclohexaneglycolate methobromide (hexapyrronium bromide) was compatible with the amides utilized in this process and showed greatly increased sweat inhibition when applied in accordance therewith.

Antimetabolites which have been shown to cause clearing in psoriatic lesions and have utility in tumor therapy, for example, 5-fluorouracil, 4-amino-n$^{10}$-methylpteroylglutamic acid and 6-mercaptopurine have been found to be compatible with the amides of the process and show vastly increased percutaneous absorption and retention when applied to skin according to the teachings of this invention.

In clinical applications antimicrobial agents such as antiparasitic, antibacterial, antifungal, antiviral and antirickettsial agents have been shown to exhibit increased percutaneous absorption and retention when used in the present process. Erythromycin; 2,2'-methylenebis (3,4,6-trichlorophenol); 3,4'5 - tribromosalicylanilide; 3,4,4'-trichlorocarbanilide; nystatin; undecylenic acid; sulfur; salicylic acid; parachlorometaxylenol; 2 - (4' - thiazolyl)-benzimidazole; iodine and iodine compounds, as iodochlorhydroxyquin, 5-iodo-2'-deoxyuridine, and 5-methylamino-2'-deoxyuridine are some of the examples of the antimicrobial agents. They exhibit an outstanding example of the utility of this invention, particularly regarding the retention factor. When these antimicrobial agents are retained on the skin in greater concentrations, they build up a continuing, long-lasting resistance to microbes and keep the microbial population at minimal levels so as to speed healing and prevent renewed infection or attack.

One of the particular advantages of the present invention is that it permits by topical administration therapy the treatment of herpes simplex, a disease that has heretofore defied treatment by any method. By administering topically to the patient 5 - iodo - 2' - deoxyuridine or 5-methylamino-2'-deoxyuridine dissolved in DMA or one of the other amides of the invention, herpes simplex of the skin can be cured. Administration of these compounds without the presence of the amide is ineffective for the purpose. This important and unprecedented therapy is made possible by the fact that the penetration of the skin by the 5-iodo-2'-deoxyuridine and 5-methylamino-2'-deoxyuridine is made possible by the action of the amide.

A series of at least 9 different experiments were performed to measure the retention of hexachlorophene in the stratum corneum or horny layer. The experiments involved the application of hexachlorophene from suspensions and solutions of hexachlorophene in "Phisohex" (a suspension of 3% hexachlorophene produced by Winthrop Laboratories, New York, N.Y.), DMA and DEA to the forearms, palms and backs of hands. The preparations were allowed to remain in contact with the skin for periods of time, varying from 15 seconds to as long as 20 minutes before the area was washed. Measurements were conducted at specified intervals of time and the areas were washed with soap and water in a consistent fashion for each of the comparisons that were made. In every comparison the preparations applied in accordance with the instant process showed enhanced retention over the corresponding preparation which did not utilize the amides of this invention. The lowest degree of enhancement achieved was about a 5-fold increase in retention while enhanced results showing as high as about a 110-fold increase in retention were observed. Similar results have been shown for trichlorosalicylanilide. Iodine also shows increased retention in the instant process and therefore exhibits the beneficial effects discussed above. The same is true of special anti-acne and antiseborreic preparations particularly those containing sulfur as the major pharmaceutically active compound. Sulfur gives increased retention in the instant process and therefore greater and longer lasting concentrations of this substance can be maintained in the affected areas of the skin.

The incorporation of emollients in the present process, such as for example, lanolin and lanolin alcohols and their ethoxylated and/or acetylated products; glycerol, glycols and their derivatives; fatty acids, their esters, their alcohols and their derivatives, give increased percutaneous absorption and increased retention resulting in improved softening and moisturizing effects.

Sex hormones also show increased percutaneous absorption and retention when applied in accordance with the present process. Androgens, estrogens and progestins are examples of such hormones. Testosterone has recently been shown to stimulate the growth of scalp hair. Thus increasing the amount of testosterone which penetrates to the hair follicle root and maintaining its reservoir there will further increase hair follicle activity.

Estrogens have long been used in a wide variety of beautifying preparations. Thus the instant process makes possible the percutaneous absorption and retention of larger quantities of these beautifying chemical compounds.

Sunscreens have also been found to be effective using the instant process and give increased retention. The utility of this process for application of sunscreens is immediately obvious since it is now possible for the sunscreen to be retained in the horny layer of the skin for long periods of time despite frequent bathing, sweating or rubbing of clothing over the area to be protected from the harmful rays of the sun. Some examples of such sunscreens are para-aminobenzoic acid, amyl p-dimethylaminobenzoate, salicylic acid, cinnamic acid and benzophenones and their derivatives.

Various products of crude coal tar which are used in the treatment of eczema, psoriasis and seborrheic dermatitis, such as "Balnetar", an extract of crude coal tar and "Sebutone," a cleanser product containing sulfur, salicylic acid, hexachlorophene and crude coal tar extract both, produced by the Foster-Milburn Company, have been applied using the instant process and also been shown to enhance retention in the horny layer.

The beneficial photodynamic action of various chemical substances such as various derivatives, extracts, components and products of crude coal tar for example in treatment of psoriasis by the Goeckerman regimen or its modifications, is also enhanced when such substances are applied in accordance with the instant process.

Another outstanding application of the instant process is in patch testing. This is one of the most widely used and simplest of methods for testing the skin to determine and identify sensitization and/or irritation potential to various substances. It is particularly useful in eruptions of contact dermatitis (dermatitis venenata) caused by plants, industrial chemicals, medicines, cosmetics, food, household articles, etc.

The patch test consists of the application to uninjured skin, contiguous to the involved area, of substances suspected to be causes of the sensitivity and/or the irritation reaction. This is done by saturating a small piece of gauze with one of these substances in a concentration that will not cause irritation in the average person. It is covered by a piece of impermeable protective material such as cellophane and then applied to the skin by adhesive plaster. Ready-made patches are available. The patches are usually allowed to remain in place forty-eight hours (unless there is pronounced irritation). It may be two or three days later before a positive reaction shows, so it is important to watch for delayed reactions.

There are many drawbacks in this method of testing. For example, the gauze and the tape holding it must remain in place for a protracted period. This is uncomfortable and inconvenient. There may even be reaction to the tape.

Using the novel process of this invention, a suspected chemical may be applied to the skin, left untouched for about five minutes and the subject allowed to go on his way without gauze pads, etc. He may even bathe normally and put clothing over the area of application.

Thus a process is provided by which suspected substances such as poison ivy, potassium dichromate, phenylene diamine, azo dyes, various antioxidants, epoxy resins and certain other plastics, can be tested rapidly and conveniently.

Until recently it has been difficult to measure percutaneous absorption. Past techniques were such that little definite work could be done because of the relatively small concentrations of substances which pass through the skin. The use of radioactive substances has simplified the measurement problems allowing for more accurate determinations. Labeled compounds containing radioactive carbon atoms have been utilized to determine the rate and degree of percutaneous absorption as well as retention in the horny layer.

Another method of estimating percutaneous absorption is to rely upon the biological activity exhibited by the stable, topically active compound. In this manner the degree of percutaneous absorption of topically applied glucocorticosteroids has been determined by studying vasoconstriction and blanching of the skin caused when these substances reach the corium. Another example of the utilization of biological activity to determine percutaneous absorption is the measurement of sweat secretion after topical application of anticholrinergics.

However, in testing, particularly for the degree of percutaneous absorption, it must be remembered that the characteristic or factor relied upon to determine penetration must be that of the chemical substance which is desired to be absorbed rather than a characteristic or factor inherent in the vehicle or absorption medium. It is fallacious to assume that wherever the vehicle or medium goes the desired chemical substance will go also. Experimentation shows that for the most part various substances, even when combined together or dissolved in one another, have different rates of percutaneous absorption.

Both in vitro and in vivo tests have been devised for determining percutaneous absorption and retention. The general method utilized in the examples which follow for determining percutaneous absorption by the in vitro method is set out below.

Leg or breast skin of normal appearance is removed from surgically amputated legs or breasts and immediately or after a period of refrigeration, cut into portions, wrapped in air-tight containers, then placed in a freezer at about $-17°$ C. to about $-22°$ C. and stored. Usually at least four such specimens are used in these experiments. At all times the skin is handled as gently as possible. Thawing is begun at room temperature about one hour prior to use. The subcutaneous tissue or fat is cut from the under surface with a scissor until the net-like pattern of the dermis is seen, care being taken to avoid cutting into the corium. The skin is then draped with the epidermis outward, over the mouth of an open glass well which is about 4 cm. in diameter, and secured in place by means of elastic bands. It is important not to injure the skin by excessive stretching over the rim of the glass well. A plastic cylinder is then attached to the epidermis with "Duco Cement," a product of E. I. du Pont de Nemours & Co. The glass well is connected to a second glass well by a glass tube. The second glass well contains a stopper which can be removed so that the wells can be filled with physiological saline which then bathes the corium side of the skin. The test solution or suspension containing a stable, topically active chemical compound labeled with a radioactive carbon atom is then applied to the epidermis contained within the small plastic cylinder. After given intervals (e.g. 4 hours, 24 hours) aliquots are removed from the glass well system and measured for radioactivity. In this way, the amount of the radioactive substance which has penetrated can be determined. The temperature and humidity are controlled by a cabinet which keeps a uniform environment. The radioactivity is measured in a Nuclear-Chicago Co. scintillation counter.

Radioactivity is expressed as the number of counts per minute registered on the apparatus at a constant efficiency. The percent of applied counts per minute penetration in 24 hours is determined, for example, simple by dividing the total number of counts per minute recovered in 24 hours by the counts per minute applied, then multiplying by 100. The concentration in the saline and the corium is assumed to be the same and the volume added by the corium to be negligible.

The technique then is briefly to apply radioactive labeled material to the epidermal side, incubate in a temperature and humidity controlled chamber for about 4 to 24 hours and take samples of the saline bathing the corium to determine radioactivity in a scintillation counter. Thus the percentage of applied material which has penetrated to the saline can be measured at any given time.

This in vitro technique is modified to determine retention in the horny layer as follows. Similar skin obtained at autopsy, is placed between two aluminum sheets and clamps are applied. This apparatus is immersed in water at about 60° C. for about two minutes, the metal plates are removed from the skin, and the epidermis with stratum corneum is carefully removed from the dermis in a continuous sheet.

After the epidermis with stratum corneum is dried on a metal gauze, squares about 1 x 1 cm. are cut from the tissue, and placed on glass slides at about 32° C. and about 50% humidity. About 0.005 ml. each of solutions of suspensions containing a stable, topically active chemical compound labeled with a radioactive carbon atom in DMA, and other vehicles, such as ethanol and benzene, is respectively placed on the stratum corneum side of the 1 cm.$^2$ pieces and allowed to remain for 22 hours at about 22° C. and about 50% humidity before washing. A group of four squares is usually treated with each solvent.

After 22 hours the squares are individually washed for ten minutes in each of three washing fluids: (1) water with detergent, (2) 70% ethanol, and (3) benzene. The fluids are constantly stirred during the washing process.

After washing, the squares of tissue are individually dissolved in 0.5 ml. of methylbenzethonium chloride, scintillation fluid was added and the radioactivity counted.

One in vivo technique for determining percutaneous absorption utilizing the biological activity of the stable topically active compounds is as follows:

Healthy, young, adult male and/or female subjects are selected. The volar surfaces of the forearms are used and solutions or suspensions of corticosteroid compounds are prepared with 95% ethanol and DMA in dilutions ranging from about 1:100 to about 1:5,000,000. Then 0.02 ml. of the various dilutions are applied from a dropping pipette on the flexor aspects of both forearms, lightly spread over an area of about 1 inch diameter and allowed to dry. The areas are left undisturbed for about 16 hours, and any sites of vasoconstriction are then noted. The DMA containing fluid was compared with the non-DMA containing fluid by placing each on equivalent areas of the forearms. The presence or absence of the physiologic reaction (vasoconstriction) was determined after a designated interval of time. If the reaction was present, it was recorded as a positive response.

This test can be utilized with corticosteroids since they cause blanching and vasoconstriction upon reaching the corium. Anticholinergics are also tested in this manner by noting the presence or absence of the physiologic reaction, i.e., the inhibition of sweating.

An in vivo technique utilized to determine retention in the horny layer involves a similar method wherein a solution containing a stable, topically active chemical compound labeled with a radioactive carbon atom is applied to the forearms of human volunteers. The stable, topically active chemical compound is solubilized in DMA (100%), ethanol (95%) and placebo cream base (supplied as placebo base for "Synalar cream" by the Syntex Company, Palo Alto, Calif.) for example. Whenever 90% or 95% ethanol is referred to hereinafter it is understood that the remainder of the vehicle is water. A 0.01 cc. aliquot of each is applied to the forearm (10 mg. of the placebo cream base) and allowed to remain in place for 60 minutes. The forearms are then washed evenly with soap and water and wiped with wet ethanol sponges.

Surface counts were measured before and after washing procedures with the gas flow, thin Mylar window, skin probe (made by the Nuclear Chicago Co.) similar to that described in Malkinson, P. D.: Studies on the Percutaneous Absorption of C–14 Labeled Steroids by Use of the Gas Flow Cell, J. Invest. Derm., 31:19 (1958). The skin probe had a background count close to 30 counts per minute and operating at about 10% efficiency.

Calculations to determine the amount of retention are made in the same manner as discussed concerning the in vitro method.

The following representative examples illustrate the process of this invention and the novel preparations which increase the percutaneous absorption of and retention of stable, topically active chemical compounds when applied to skin. Unless otherwise noted percentage compositions are by weight throughout the entire specification with the exception of the percentage compositions of liquid vehicles in one another which are given on a volume basis.

EXAMPLE I

Using the in vitro radioactive labeled carbon method for determining percutaneous absorption one large piece of abdominal skin from a 46 year old white female was used to study penetration of $C^{14}$-griseofulvin (supplied by the Ayerst Laboratories, Montreal, Canada), with specific activity of 0.567 microcury/mg.

Aliquots containing 0.18% $C^{14}$-griseofulvin in DMA, ethanol and benzene were applied to three skin samples for each vehicle. Thus fifteen samples in all were used from the one large skin specimen. Results with the same large piece of skin show good internal consistency (see Table 1) although variations between different large skin specimens may vary 10 fold or more. All of the results are based on comparing the effect of various vehicles using multiple samples from the same large piece of skin. The samples were incubated at about 32° C. and about 50% humidity for about 24 hours.

TABLE 1

| | 24-Hour Penetration, percent | |
|---|---|---|
| | Mean | Range |
| DMA (100%) | 1.59 | 0.90–2.09 |
| Ethanol (100%) | 0.11 | 0.08–0.14 |
| Benzene (100%) | 0.04 | 0.01–0.07 |

EXAMPLE II

Using the in vitro radioactive labeled carbon method for determining percutaneous absorption one large piece of leg skin from a 64 year old white male was used to study penetration of $C^{14}$-hydrocortisone in DMA (100%) and ethanol (95%). Five samples were used for each preparation. The concentration of $C^{14}$-hydrocortisone was 0.01%. A 0.01 cc. aliquot of each preparation was applied to each of the samples and the samples were incubated at about 32° C. and about 50% humidity for about 24 hours. 2 cc. aliquots were taken at the end of 24 hours for scintillation counting. The results are shown in Table 2.

TABLE 2

|  | 24-Hour Penetration, percent | |
|---|---|---|
|  | Av. | Range |
| DMA (100%) | 0.12 | (0.04–0.25) |
| Ethanol (95%) | 0.02 | (0.00–0.05) |

EXAMPLE III

Using the in vitro radioactive labeled carbon method for determining retention non-hairy white abdominal skin obtained at autopsy was treated with 0.005 ml. of a 0.18% solution of $C^{14}$-griseofulvin in DMA, ethanol and benzene on the stratum corneum side of the 1 cm.² pieces. A group of four squares was treated with each preparation. The results are shown in Table 3.

TABLE 3

|  | Percent of applied counts retained, percent | (Relative percent) |
|---|---|---|
| DMA (100%) | 0.88 | 100 |
| Ethanol (95%) | 0.20 | 22.7 |
| Benzene (100%) | 0.14 | 15.9 |

The preparations were applied about 22 hours prior to washing in ethanol, water with detergent, and benzene (each for 10 minutes).

EXAMPLE IV

Using the in vivo radioactive labeled carbon method for determining retention $C^{14}$-hydrocortisone (0.1%) was incorporated in DMA, and placebo cream base (supplied as placebo base for "Synalar Cream" by the Syntex Company, Palo Alto, Calif.) Aliquots of 0.01 cc. (10 mg. placebo base) were applied to the forearm and allowed to remain in place for 60 minutes then washed with soap and water and wiped with alcohol sponges. Results are given in Table 4 for the four subjects tested.

TABLE 4

|  | Average percent retention and range | | |
|---|---|---|---|
|  | 2 SW++ | 5 SW | 3 A+++ |
| DMA (100%) | 12.2(26.5–6.5) | 7.1(11.4–4.6) | 5.3(8.6–3.1) |
| Ethanol (95%) | 2.1(4.7–0.9) | 1.2(3.1–0.5) | 0.8(2.4–0.3) |
| Cream Base | 2.5(5.4–0.8) | 1.4(3.4–0.5) | 0.9(2.2–0.4) |

++1 SW=5 strokes of soap followed by a standard rinse in tap water.
+++1 A=One firm swipe over the area with a wet ethanol sponge.

Similar results using the above procedure were obtained for the $C^{14}$-cortocosteroids triamcinolone acetonide and fluocinolone acetonide.

EXAMPLE V

Using the in vivo method based on the vasoconstriction activity of cortocosteroids, percutaneous absorption of triamcinolone acetonide was determined at various concentrations for 10 subjects. The results are given below in Table 5. Four sites corresponding to the different concentrations were used on each patient's forearm. A 0.01 cc. aliquot of the appropriate preparation was applied to each site. The number of sites showing vasoconstriction were recorded in relation to total number of applications sites for the particular concentration, e.g. 8/10 means 8 subjects out of 10 show vasoconstriction.

TABLE 5

|  | 0.2% | 0.04% | 0.008% | 0.00016% |
|---|---|---|---|---|
| DMA (100%) | 10/10 | 6/10 | 3/10 | 0/10 |
| DMA (50% in ethanol) | 8/10 | 4/10 | 1/10 | 0/10 |
| Alcohol (95% in water) | 8/10 | 1/10 | 0/10 | 0/10 |

Similar results have also been experimentally shown using the above procedure for flurandrenolone acetonide.

EXAMPLE VI

Using the in vivo labeled radioactive carbon method for determining retention $C^{14}$-fluocinolone acetonide (FA) was dissolved in ethanol (95%) and DMA (50% in ethanol). A 0.01 ml. aliquot was placed on the skin and left for 15 minutes then washed with soap and water. The 0.01% FA–95% ethanol exhibited 1.0% retention. The 0.01% FA–50% DMA in ethanol exhibited 11.7% retention. After 15 soap and water washes the 95% ethanol solution exhibited only .4% retention while the FA applied in 50% DMA in ethanol exhibited a retention of 5.3%.

Using the exact same technique as above $C^{14}$-hexapyronium bromide exhibited a 19.5% retention after 3 soap and water rinses when applied from 50% DMA in ethanol solution. Under the same circumstances of application and washing this substance exhibited only a 3.7% retention when applied from a 95% ethanol solution. After three more such washes the respective retentions were 13.3% and 3.4%.

EXAMPLE VII

Using the in vivo vasoconstrictor test for measuring cortocosteroid penetration, fluocinolone acetonide was applied to the forearms of 15 healthy young adult subjects after solubilization in different vehicles. The results are given below in Table 6. Of particular importance is the fact that no vasoconstriction was seen with 100% DMA applied alone as a control.

TABLE 6

|  | Penetration | | | |
|---|---|---|---|---|
| Concentrations | 0.1% | 0.02% | 0.004% | 0.0008% |
| DMA 60% in ethanol | 8/15 | 6/15 | 1/15 | 0/15 |
| Ethanol 95% | 5/15 | 0/15 | 0/15 | 0/15 |
| DMA alone (100%) | 0/15 | 0/15 | 0/15 | 0/15 |

EXAMPLE VIII

Using the in vivo radioactive labeled carbon method, retention of glycerol in preparations containing 0.025% $C^{14}$-glycerol were determined when solubilized in the following vehicles, applied to the forearm for 35 minutes and followed by 5 soap and water washes (see Table 7).

Table 7

0.025% glycerol in—   Retention, percent
Methylene chloride 50%+isopropyl alcohol __ 5.2
Xylol 50% in isopropyl alcohol _____ 2.0
95% alcohol (90%)+10% isopropyl alcohol _____ 10.6
DMA 50%+isopropyl alcohol 50% _____ 41.8

Using the in vitro radioactive labeled carbon method percutaneous absorption was determined for the above compound when applied in 0.025% concentrations and solubilized in the following vehicles: (1) 50% DMA in ethanol; (2) 50% ethyl nicotinate in ethanol, and (3) 50% water in ethanol. Penetration was allowed to continue for 24 hours resulting in 0.46% penetration for the 50% DMA preparation and 0.16% penetration for 50% preparations of ethyl nicotinate and water respectively. Percentage figures given throughout this example are by volume.

EXAMPLE IX

Using the in vivo radioactive labeled carbon method it was found that testosterone after about 4 hours at about 32° C. and about 50% humidity was percutaneously absorbed to the degree of 0.149% in DMA while no absorption was noted in methanol. After an elapse of about 24 hours testosterone was percutaneously absorbed to the degree of 7.80% in DMA and 0.87% in methanol.

EXAMPLE X

In accordance with the procedures of Example IX oestradiol was tested for percutaneous absorption giving the following results.

TABLE 8

|  | Absorption | |
| --- | --- | --- |
|  | 4 hours, percent | 24 hours, percent |
| DMA (100%) | 0.39 | 6.28 |
| Benzene (100%) | 0.02 | 1.55 |

EXAMPLE XI

To determine the retention of sunscreen on the skin after exposure to water a group of 11 subjects applied a composition consisting of 10% amyl p-dimethylaminobenzoate, 45% DMA, and 45% isopropyl palmitate. The subjects applied the sunscreen on both forearms and waited from ½ hour to 1 hour before going into the water to swim. They were exposed to the sun at Miami Beach in May for at least two hours between approximately 11:00 a.m. and 1:00 p.m. Eight subjects showed absolutely no signs of redness. Two subjects, having fair complexions, showed light pink reactions and only one subject, having a fair complexion, showed a markedly pink reaction. None of the subjects complained of any subjective sensation (sunburn irritation).

The results are summarized below.

TABLE 9

| Subject No.: | Time After Application | No. Days Used | Results |
| --- | --- | --- | --- |
| 1(D) | ½ hour | 5 | Negative. |
| 2(L) | do | 5 | Do. |
| 3(D) | 1 hour | 3 | Do. |
| 4(L) | do | 4 | Light pink. |
| 5(L) | ½ hour | 2 | Negative. |
| 6(L) | do | 6 | Do. |
| 7(L) | do | 5 | Markedly pink. |
| 8(D) | 1 hour | 4 | Negative. |
| 9(D) | ½ hour | 1 | Do. |
| 10(L) | do | 5 | Do. |
| 11(L) | do | 2 | Do. |

(D)=Dark Skin; (L)=Light Skin.

Five subjects applied preparations consisting of (A) 5% amyl p-dimethylaminobenzoate, 50% DMA and 45% isopropyl palmitate and (B) 5% amyl p-dimethylaminobenzoate and 95% DMA. The preparations were applied with a glass rod so as to create a thin uniform film on the flexor aspects of the forearm. After 2 hours the application sites were washed thoroughly in a uniform manner with soap and water, dried and then exposed to ultra-violet radiation from a hot quartz mercury lamp at a distance of thirty inches for three minutes.

The results are summarized below.

TABLE 10

| | U.V. reaction to preparation A | U.V. reaction to preparation B |
| --- | --- | --- |
| Subject No.: | | |
| 1 | Pink | Light pink. |
| 2 | Light pink | Negative. |
| 3 | Negative | Do. |
| 4 | do | Do. |
| 5 | Pink | Light pink. |

Two subjects applied the preparations immediately described above and a third preparation (C) consisting of 5% amyl p-dimethylaminobenzoate and 95% water resistant cream. The preparations were applied and exposed to ultra-violet light in the same manner as described immediately above with the exception that subject No. 1 washed the application sites thoroughly after one hour and subject No. 2 washed the reaction sites thoroughly after one-half hour. The results are given below.

TABLE 11

| Subject No. | U.V. reaction to Preparation A | U.V. reaction to preparation B | U.V. reaction to preparation C |
| --- | --- | --- | --- |
| 1 | Light pink | Negative | Red. |
| 2 | Very markedly pink | do | Red. |

EXAMPLE XII

An in vivo procedure based on fluorescence was utilized for determining the retention of "Balnetar." A preparation containing 1 cc. of Balnetar was solubilized in 2 cc. of DMA and a second preparation containing 1 cc. of Balnetar was solubilized in 2 cc. of $H_2O$. 0.01 cc. of both preparations were applied to the forearm of a healthy white male. Both areas of application gave brilliant fluorescence. Both areas were then washed equally with 30 strokes of soap and a water rinse 20 minutes after application. The preparation utilizing DMA as the application vehicle exhibited brilliant fluorescence, while the water applied preparation exhibited mild fluorescence. After application of 30 more soap strokes and a water rinse to each area the DMA preparation continued to exhibit brilliant fluorescence while the water preparation showed only trace fluorescence. Application of thirty more soap strokes and a water rinse to each resulted in mild fluorescence for the DMA preparation and no fluorescence for the water preparation.

EXAMPLE XIII

Hartley strain albino guinea pigs were tested to determine the enhancement of the photodynamic effect of anthracene, a component of crude coal tar, when applied in accordance with the instant process.

Four guinea pigs, each weighing approximately 350 grams, were used in the test.

The dorsal surface of each pig was clipped and depliated using a 50% barium sulfide preparation. No animal manifested erythema from this procedure. The dorsal surface was then divided into quadrants for test purpose with a light opaque material. The anthracene was applied by dipping a glass rod into the solution and lightly stroking the area ten times. All materials were tested in the presence and absence of light. The light source used consisted of a bank of 4 Westinghouse FS20 black light fluorescent tubes having an emission spectra range from 3200 to 4500 A. Target skin distance was maintained at 5 inches through window glass for sixty minutes at a room temperature of about 68°–70° F. and humidity of about 30% to 40%. All animals were assessed in terms of erythema response 24 hours later. Results of the tests are listed below.

TABLE 12.—ANTHRACENE PHOTODYNAMIC EFFECT

| | 24-Hour Erythema in Guinea Pigs | |
| --- | --- | --- |
| Concentration of Anthracene | Black Light | No Light |
| $5 \times 10^{-4}$ M Anthracene in DMA | 0 | 0 |
| $5 \times 10^{-4}$ M Anthracene in alcohol | 0 | 0 |
| $10^{-3}$ M Anthracene in DMA | 1 | 0 |
| $10^{-3}$ M Anthracene in alcohol | 0.5 | 0 |
| $10^{-3}$ M Anthracene in DMA | 1 | 0 |
| $10^{-3}$ M Anthracene in alcohol | 0.5 | 0 |
| $10^{-3}$ M Anthracene in DMA | 1.5 | 0 |
| $10^{-3}$ M Anthracene in alcohol | 0.5 | 0 |
| $10^{-3}$ M Anthracene in DMA | 2 | 0 |
| $10^{-3}$ M Anthracene in alcohol | 1 | 0 |
| $10^{-3}$ M Anthracene in DMA | 2 | 0 |
| $10^{-3}$ M Anthracene in alcohol | 0.5 | 0 |
| $10^{-1}$ M Anthracene in DMA | 2.5 | 0 |
| $10^{-1}$ M Anthracene in alcohol | 1.5 | 0 |

The solvents were used in 100% concentrations in each instance.

The erythema scale used for all studies is as follows:

0 = No erythema.
0.5 = Questionable erythema.
1 = Minimal but definite erythema.
2 = Moderate erythema.
3 = Considerable erythema.
4 = Maximal buck red erythema and edema.

EXAMPLE XIV

Tetracycline retention was tested in the same manner as described concerning "Balnetar" in Example XII. Preparations containing 0.01 cc. of 250 mg. of "Balnetar" in 5 cc. H$_2$O and 250 mg. of "Balnetar" in 5 cc. DMA were applied and after 30 minutes given a first standard wash as in Example XII. The DMA preparation showed bright fluorescence and the water preparation only faint fluorescence. After a second standard wash, the DMA preparation showed mild fluorescence and the water preparation showed no fluorescence. After the third standard wash the DMA prapartion continued to display faint fluorescence and the water preparation showed no fluorescence.

EXAMPLE VX

The in vivo method using labeled radioactive carbon was used for determining retention with sulfur supplied as labeled S$^{35}$. Preparation of S$^{35}$ were prepared as follows: (1) sulfur-35 in 50% alcohol in water; (2) sulfur-35 in liquid shampoo+50% H$_2$O; and (3) sulfur-35 in liquid shampoo+50% DMA. A 0.01 cc. aliquot of each was applied to the forearm for about 20 minutes and then washed with soap and water in uniform manner. The measured percentage retention was as follows: (1) 11.7%; (2) 11.7%; and (3) 29.5%.

EXAMPLE XVI

Using an in vivo method for determining retention based on the staining effect of iodine (similar to the fluorescence studies of Example XII) the following preparations were made: (1) 0.1 cc. 2% iodine in 95% alcohol+0.1 cc. DMA; (2) 0.1 cc. 2% iodine in 95% alcohol+0.1 cc. H$_2$O; (3) 0.1 cc. 2% iodine in 95% alcohol+0.1 cc. 95% alcohol; and (4) 0.1 cc. 2% iodine in 95% alcohol +0.1 cc. lotion base (Squibb). A 0.0.1 cc. aliquot of each was applied to the forearm. These were then left in place on the forearm for 10 minutes and then washed with 10 strokes of soap and water and standard rinse. A brown stain was intense at 1. Faint stains were barely visible at 2, 3 and 4.

EXAMPLE XVII

For purposes of determining the effect of time upon percutaneous absorption and/or retention labeled C$^{14}$-triamcinolone acetonide was applied utilizing various vehicles and the retention was measured as shown below in accordance with the in vivo radioactive carbon retention method.

TABLE 13

| 0.025% C$^{14}$-triacinolone acetonide in— | Retention After Washing | | |
|---|---|---|---|
| | 5 min., percent | 3 hours, percent | 6 hours, percent |
| DMA (60-70% in ethanol) | 17.0 | 17.2 | 18.2 |
| Ethanol (50-95% in water) | 3.0 | 2.4 | 5.1 |
| Cream Base [1] | 1.4 | 1.9 | 4.8 |
| Lotion Base [2] | 2.3 | | 5.0 |

[1] Cream Base = "SYNALAR" Cream Base.
[2] Lotion Base = Squibb Lotion Base.

The high retention level of triamcinolone acetonide in the horny layer is thus shown to be achieved by about 5 minutes exposure to DMA with additional exposure causing little or no additional reservoir build up. This experiment again shows the utility of the instant process in creating higher levels of retention than can be achieved with conventional methods of application and known vehicles.

EXAMPLE XVIII

In order to determine the effect of time upon the retention of hexachlorophene a series of in vivo labeled radioactive carbon tests were run for determining retention.

Three preparations containing 10 mg. C$^{14}$-hexachlorophene in: (A) 30 mg. unlabeled hexachlorophene and 1 cc. DMA; (B) 30 mg. unlabeled hexachlorophene and 1 cc. DMA in 2% methocel; and (C) in "Phisohex." A 0.01 cc. aliquot of each of the above preparations was applied to the dorsum of the forearm and left in place for 12 minutes and then removed by uniform washing. The percent retention after various washing is given below.

TABLE 14

| | A, percent | B, percent | C, percent |
|---|---|---|---|
| 10 soap strokes and rinses | 50 | 57 | 1.4 |
| 80 soap strokes and rinses | 34.4 | 27.7 | 0.5 |
| 160 soap strokes and rinses | 18.1 | 22.4 | 0.3 |
| Do | 12.3 | 17.2 | 0.1 |
| 14 alcohol swipes | 6.0 | 10.2 | 0.06 |
| 2 days later | 1.6 | 2.1 | 0.03 |

A 0.06 cc. aliquot of preparations B and C was applied to the palm of each hand. The preparation was then left in place for 90 seconds and removed by washing at the application site. The percent retention after various washings is given below.

TABLE 15

| | B, percent | C, percent |
|---|---|---|
| 10 soap strokes and water rinse | 97.7 | 6.0 |
| 40 soap strokes and rinsing | 73.8 | 2.8 |
| 5 minute soap scrub | 34.1 | 1.0 |
| Do | 17.4 | 0.3 |
| days later | 2.8 | 0.05 |

A 0.06 cc. aliquot of preparations B and C as well as (D) 10 mg. of C$^{14}$-hexachlorophene in 30 mg. unlabeled hexachlorophene in 1 cc. of diethyl acetamide was applied to the palm of each hand and left in place for 6 minutes and removed by washing. The percent retention after various washings is given below.

TABLE 16

| | B, percent | C, percent | D, percent |
|---|---|---|---|
| 12 soap strokes and water rinse | 45.6 | 1.4 | 21.4 |
| 50 soap strokes and water rinse | 22.0 | 0.3 | 8.9 |
| 8 minute soap scrub | 5.1 | 0.05 | 1.8 |

Preparations containing 10 mg. of C$^{14}$-hexachlorophene added to (A) 1 cc. of a 3% solution of hexachlorophene in DMA and (B) added to 1 cc. of a 3% suspension of hexachlorophene ("Phisohex") were tested. A 0.01 cc. aliquot of each preparation was applied to the dorsum of the hand and allowed to remain in place for 15 seconds and then washed with 10 soap strokes and 10 rinses with water. The percent retention after one and two days is given below.

TABLE 17

| | Day 1, percent | Day 2, percent |
|---|---|---|
| Preparation: | | |
| A | 1.7-2.2 | 0.7-1.3 |
| B | 0.08-0.06 | 0.0-0.0 |

Using the preparations and procedure given immediately above, a 0.01 cc. of each preparation was applied with a pipette and then washed with soap and water. The percent retention measured at specified time intervals is given below.

TABLE 18

| Preparation | Amount Retained | | | | |
|---|---|---|---|---|---|
| | 30 sec., percent | 60 sec., percent | 120 sec., percent | 180 sec., percent | 30 min., percent |
| A—20 soap strokes | 2.8 | 4.6 | 10.6 | 17.1 | 46.2 |
| and | | | | | |
| B—10 H₂O rinses | 0.5 | 0.6 | 1.0 | 0.7 | 3.0 |
| A—40 more soap strokes | 2.3 | 3.5 | 7.5 | 10.8 | (¹) |
| and | | | | | |
| B—10 H₂O rinses | 0.3 | 0.3 | 0.3 | 0.3 | (¹) |
| A—80 more soap strokes | 1.4 | 2.3 | 5.7 | 5.8 | 33.2 |
| and | | | | | |
| B—10 H₂O rinses | 0.1 | 0.1 | 0.2 | 0.1 | 1.5 |
| A—80 more soap strokes | 0.8 | 1.5 | 3.4 | 3.9 | 28.9 |
| and | | | | | |
| B—10 H₂O rinses | 0.02 | 0.03 | 0.06 | 0.04 | 0.6 |

¹ Not done.

After the above procedure and a vigorous 5 minute soap scrub, the horny layer was removed with successive Scotch tape strippings. Over 95% of the remaining counts (representing radioactive $C^{14}$-hexachlorophene) were removed along with the horny layer. This conclusively shows the existence of a reservoir or depot in the horny layer for retention and the build up of high concentrations of the beneficial compound in the reservoir when applied according to this process.

EXAMPLE XIX

Different germicidal agents and antibiotics were tested in DMA and water to assay the retention of their germicidal activity. The particular preparation was applied to the skin and left in place for from 5 to 10 minutes and then removed by washing. Scrapings of the horny layer were implanted on blood agar plates inoculated with organisms (*Staphylococcus albus* and alpha streptococcus, *C. albicans* and *Trichophyton mentagrophytes*) to test the inhibitory activity of these horny layer scrapings. Such scrapings were taken before and after washing and once daily as long as activity remained. Six adult volunteers had the test preparations applied to their forearms (0.01 cc. to each spot). After 15 minutes a scraping of horny material from each area was taken and implanted on the appropriate medium to observe antimicrobial action, if any. Then the areas were washed in running tap water with gentle rubbing of the areas while the water ran over the areas. This rinse was for 30 seconds. Scrapings were also taken after the rinse and placed on the appropriate media to observe antimicrobial activity.

The media were (1) blood agar plates inoculated with *Staphylococcus albus* and alpha streptococcus before implanting horny material scrapings; (2) corn meal agar (pour plates) inoculated with C. albicans before implanting scrapings; (3) Sabouraud media (pour plates) were inoculated with *T. mentagrophytes* (stock culture) before implanting scrapings.

The following preparations were tested:

(A) Precipitated sulfur (200 mg.) in 10 cc. DMA;
(B) Precipitated sulfur (200 mg.) in 10 cc. distilled H₂O;
(C) Iodochlorohydroxyquin (20 mg.) in cc. DMA;
(D) Iodochlorohydroxyquin (20 mg.) in 1 cc. distilled H₂O;
(E) Erythromycin (20 mg.) in 1 cc. DMA;
(F) Erythromycin (20 mg.) in 1 cc. distilled H₂O;
(G) Tetracycline (20 mg.) in 1 cc. DMA;
(H) Tetracycline (20 mg.) in 1 cc. distilled H₂O;
(I) Hexachlorophene (20 mg.) in 1 cc. DMA;
(J) Hexachlorophene (20 mg.) in 1 cc. distilled H₂O.

All these preparations were mixed (shaken) well before pipetting onto skin. The results are summarized below:

TABLE 19

| | No. of Subjects Showing Good Inhibition Out of Total of Six Subjects Treated | | |
|---|---|---|---|
| Horny Material From Areas Treated With Preparation | Culture Media | | |
| | 1 | 2 | 3 |
| (A): | | | |
| Before washing | 6 | | |
| After washing | 5 | | |
| After (1 day) | 4 | | |
| After (2 days) | 2 | | |
| (B): | | | |
| Before washing | 6 | | |
| After washing | 2 | | |
| After (1 day) | 0 | | |
| After (2 days) | 0 | | |
| (C): | | | |
| Before washing | 6 | 6 | 6 |
| After washing | 5 | 6 | 6 |
| After (1 day) | 3 | ²3 | ²2 |
| After (2 days) | ¹2 | ²1 | 0 |
| (D): | | | |
| Before washing | 6 | 6 | 6 |
| After washing | 1 | 2 | 1 |
| After (1 day) | ³1 | 0 | 0 |
| After (2 days) | 0 | 0 | 0 |
| (E): | | | |
| Before washing | 6 | | |
| After washing | 5 | | |
| After (1 day) | ⁴2 | | |
| After (2 days) | ²1 | | |
| (F): | | | |
| Before washing | 6 | | |
| After washing | 2 | | |
| After (1 day) | 0 | | |
| After (2 days) | | | |
| (G): | | | |
| Before washing | 5 | | |
| After washing | 3 | | |
| After (1 day) | 0 | | |
| After (2 days) | | | |
| (H): | | | |
| Before washing | 5 | | |
| After washing | 1 | | |
| After (1 day) | 0 | | |
| After (2 days) | | | |
| (I): | | | |
| Before washing | 6 | | |
| After washing | 5 | | |
| After (1 day) | 2 | | |
| After (2 days) | ⁴1 | | |
| After (3 days) | ⁴1 | | |
| (J): | | | |
| Before washing | 6 | | |
| After washing | 1 | | |
| After (1 day) | 0 | | |

¹ Slight inhibition.
² Slight.
³ Possible slight.
⁴ Fair.

Thus is can be seen that antibiotic activity was retained consistently longer when the germicide or antibiotic was applied according to the present process.

Chloromycetin and oleandomycin were also retained well when applied in DMA and maintained good bacterial antibiotic activity in the horny layer for over 24 hours after a 10 minute application followed by a washing.

Preparations of 0.01–0.02 cc. of 2% tetracycline in pure DMA, and distilled water were applied to whole skin samples in vitro and incubated at about 37° C., at about 50% relative humidity for 20 hours. The epidermis was carefully removed and punch biopsies were taken. These punch biopsies were implanted on blood agar plates inoculated with alpha streptococcus and *Staphylococcus albus* both of which were sensitive to tetracycline by the disc method. Many such experiments were done. About 50% of the time, the skin treated with DMA and tetracycline would show some inhibition of growth. The water and tetracycline failed to show inhibition at any time. Erythromycin, dimethylchlortetracycline, iodochlorhydroxyquin and chloramphenicol all show enhanced activity when applied in accordance with the instant process.

Excellent results in the treatment of herpes simplex of the skin, a disease that has heretofore defied treatment, have been obtained by administering either 5-iodo-2'-deoxyuridine or 5-methylamino-2'-deoxyuridine along with an amide of the invention, such as DMA. Thus by administering either of these medicaments dissolved in DMA, such as a 1% by weight solution in DMA, provides excellent results although the medicaments by themselves or administered in the usual solvents are ineffective. In the treatment, very small doses, such as 0.01 ml. of the 1% solution, are applied to the site of the lesions.

The most preferred amide for utilization in the instant process is N,N-dimethylacetamide (DMA), a liquid of the formula CH$_3$CO.N(CH$_3$)$_2$, having a boiling point of 165.5° C. and a specific gravity of 0.943. It is miscible with water and fixed oils in all proportions. This substance has been shown by the prior art to be completely acceptable for topical or parenteral application. At high concentrations some subjects have experienced transient erythema (very slightly burning sensation) for 4–5 minutes after application of preparations containing very high levels of DMA. However, no lasting effects or discomfort were noted.

Despite attempts to insure complete uniformity it must be recognized and understood that the exact qualities and characteristics of skin vary somewhat from subject to subject. Therefore, it may be impossible to exactly duplicate the quantitative results achieved in some of the above experiments. However, given similar samples of skin the same ratios of percutaneous absorption and retention should be observed between the various preparations applied in accordance with the teachings of the specification.

The amides of this invention may be used alone, in combination with the stable, topically active compounds or with other additional pharmaceutically acceptable surface active agents, emulsifiers, solvents, vehicles or other pharmaceutically acceptable bases. For example, the amides of this invention are compatible in all proportions with the following solvents or vehicles; water, isopropanol, ethanol and fatty acid esters to name a few widely used solvents.

It has been shown that the relationship between percutaneous absorption and retention for any given compound and the percentage of amide in the preparation is approximately directly proportional, i.e., the more amide utilized the greater the degree of percutaneous absorption and retention. Thus the only limitations upon the ratio of components in any given preparation are dictated by practical considerations.

One can, of course, use preparations containing practically 100% amide. However, since there is a certain leveling effect at the upper concentration of amide used and since one should have an appreciable amount of stable, topically active chemical component present for treatment purposes, it can be said that it is preferable to utilize between about 25% to about 95% amide in the composition and process of this invention. Due to the enhanced rates of absorption and retention preparations containing as much as about 99.999% amide and only 0.001% stable, topically active compound can be applied with beneficial results.

The effect of the present process upon the rate of percutaneous absorption or retention takes place almost immediately upon application of the preparation to the skin. Thus it can be said that any contact with the skin utilizing this process shows enhanced results over contact for the same period of time by the chemical compound alone or in processes not utilizing the instant amides.

Application of the stable, topically active chemical compound to the skin in accordance with the instant process for a period of about five minutes gives the optimum retention in relation to the length of contacting time. Longer contacting periods while giving somewhat greater total retention concentration or more percutaneously absorbed substance are insignificant in relation to the total amount absorbed or retained within the optimum time period of about 5 minutes.

While specific operable compounds or classes of compounds have been disclosed throughout this specification, it is to be understood that their therapeutically useful derivatives, salts and analogues are also of benefit when applied in accordance with the instant process.

As many apparently widely different embodiments of this invention may be made without departing from the spirit and scope thereof, it is understood that this invention is not to be limited except as defined in the appended claims.

What is claimed is:
1. In a process for administering a beneficial chemical compound topically to the body, said beneficial chemical compound being a member selected from the class consisting of 1-methyl-3-pyrrolidyl-α-phenylcyclohexane glycolate methobromide; 5-fluorouracil; 4-amino-n$^{10}$-methylpteroylglutamic acid; 6-mercaptopurine; erythromycin; 2,2'-methylenebis (3,4,6-trichlorophenol); 3,4',5-tribromosalicylanilide; 3,4,'-trichlorocarbanilide; nystatin; undecylenic acid; sulfur, salicylic acid; parachlorometaxylenol; 2 - (4' - thiazolyl) - benzimidazole; iodine; iodochlorohydroxyquin; 5-iodo-2'-deoxyuridine; 5-methylamino-2'-deoxyuridine; hexachlorophene; trichlorosalicylanilide; testosterone; cinnamic acid; para-aminobenzoic acid; amyl-p-dimethylaminobenzoate; oestrodiol; coal tar; tetracycline; dimethylchlortetracycline; chloramphenicol; and ethyl nicotinate, the improvement which comprises increasing the percutaneous absorption of effective amounts of said beneficial chemical compound into the skin by having present an amide having the structural formula:

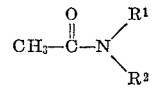

wherein R$^1$ is a member of the group consisting of hydrogen and alkyl radicals containing not more than two carbon atoms and R$^2$ is an alkyl radical containing not more than two carbon atoms.

2. A process in accordance with claim 1 wherein the amide is N,N-dimethylacetamide.

3. In a process for increasing the antimicrobial activity of the skin, the improvement which comprises increasing the percutaneous absorption of effective amounts of hexachlorophene into the skin by applying hexachlorophene to the skin in the presence of an amide having the structural formula:

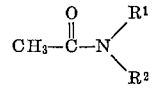

wherein R$^1$ is a member of the group consisting of hydrogen and alkyl radicals containing not more than two carbon atoms and R$^2$ is an alkyl radical containing not more than two carbon atoms.

4. A process according to claim 3 wherein the amide is N,N-dimethylacetamide.

5. In a process for increasing the antimicrobial activity of the skin, the improvement which comprises increasing the percutaneous absorption of effective amounts of 5-iodo-2'-deoxyuridine into the skin by applying 5-iodo-2'-deoxyuridine to the skin in the presence of an amide having the structural formula:

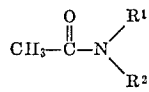

wherein $R^1$ is a member of the group consisting of hydrogen and alkyl radicals containing not more than two carbon atoms and $R^2$ is an alkyl radical containing not more tha two carbon atoms.

6. A process according to claim 5 wherein the amide is N,N-dimethylacetamide.

7. In a process for increasing the antimicrobial activity of the skin, the improvement which comprises increasing the percutaneous absorption of effective amounts of 5-methylamino-2'-deoxyuridine into the skin by applying 5-methylamino-2'-deoxyuridine to the skin in the presence of an amide having the structural formula:

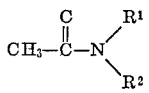

wherein $R^1$ is a member of the group consisting of hydrogen and alkyl radicals containing not more than two carbon atoms and $R^2$ is an alkyl radical containing not more than two carbon atoms.

8. A process according to claim 7, wherein the amide is N,N-dimethylacetamide.

9. In a process for administering a beneficial chemical compound topically to the body, said beneficial chemical compound being a member selected from the class consisting of 1-methyl-3-pyrrolidyl-α-phenylcyclohexane glycolate methobromide; 5-fluorouracil; 4-amino-$n^{10}$-methyl pteroylglutamic acid; 6-mercaptopurine; erythromycin; 2,2'-methylenebis (3,4,6-trichlorophenol); 3,4'5-tribromosalicylanilide; 3,4,4'-trichlorocarbanilide; nystatin; undecylenic acid; sulfur; salicylic acid; parachlorometaxylenol; 2-(4'-thiazolyl)-benzimidazole; iodine; iodochlorohydroxyquin; 5-iodo-2'-deoxyuridine; 5-methylamino-2'-deoxyuridine; hexachlorophene; trichlorosalicylanilide; testosterone; cinnamic acid; para-aminobenzoic acid; amyl-p-dimethylaminobenzoate; oestrodiol; coal tar; tetracycline; dimethylchlortetracycline; chloramphenicol; and ethyl nicotinate, the improvement which comprises increasing the percutaneous absorption of effective amounts of said beneficial chemical compounds into the skin by applying it to the skin in a pharmaceutically acceptable vehicle having as one component an amide having the structural formula:

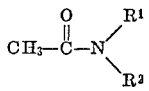

wherein $R^1$ is a member of the group consisting of hydrogen and alkyl radicals containing not more than two carbon atoms and $R^2$ is an alkyl radical containing not more than two carbon atoms.

10. A process in accordance with claim 9 wherein the amide is N,N-dimethylacetamide.

11. A process in accordance with claim 9 wherein said amide is present in an amount of 25 to 95% by weight of the composition applied to the skin.

12. A process in accordance with claim 9 wherein said beneficial chemical compounds is present in an amount of between about 0.001% to about 80% by weight of the composition applied.

13. A composition for providing increased percutaneous absorption of therapeutically effective amounts of an otherwise non-skin-absorbable pharmaceutically-active agent, said composition comprising a pharmaceutically-active agent selected from the class consisting of 1-methyl-3-pyrrolidyl-α-phenylcyclohexane glycolate methobromide; 5-fluorouracil; 4-amino-$n^{10}$-methylpteroylglutamic acid; 6-mercaptopurine; erythromycin; 2,2'-methylenebis (3,4,6-trichlorophenol); 3,4'5-tribromosalicylanilide; 3,4,4'-trichlorocarbanilide; nystatin; undecylenic acid; sulfur, salicylic acid; parachlorometaxylenol; 2-(4'-thiazolyl)-benzimidazole; iodine; iodochlorohydroxyquin; 5-iodo-2'-deoxyuridine; 5-methylamino-2'-deoxyuridine; hexachlorophene; trichlorosalicylanilide; testosterone; cinnamic acid; para-aminobenzoic acid; amyl-p-dimethylaminobenzoate; oestrodiol; coal tar; tetracycline; dimethylchlortetracycline; chloroamphenicol; and ethyl nicotinate, dissolved in an amide having the structural formula:

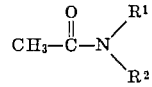

wherein $R^1$ is a member of the group consisting of hydrogen and alkyl radicals containing not more than two carbon atoms and $R^2$ is an alkyl radical containing not more than two carbon atoms.

14. A composition according to claim 13 wherein the amide is N,N-dimethylacetamide.

15. A composition according to claim 13 wherein the pharmaceutically-active agent is hexachlorophene.

16. A composition according to claim 13 wherein the pharmaceutically-active agent is 5-iodo-2'-deoxyuridine.

17. A composition according to claim 13 wherein the pharmaceutically-active agent is 5-methylamino-2'-deoxyuridine.

No references cited.

S. K. ROSE, Primary Examiner

U.S. Cl. X.R.

424—60, 120, 150, 164, 167, 181, 227, 233, 240, 251, 253, 258, 264, 270, 317, 318, 320, 322, 324, 347, 358

UNITED STATES PATENT OFFICE
CERTIFICATE OF CORRECTION

Patent No. 3,472,931　　　　　　　　　　　　　　October 14, 1969

Richard B. Stoughton

It is certified that error appears in the above identified patent and that said Letters Patent are hereby corrected as shown below:

In the heading to the printed specification, line 4, "Bahu" should read -- Baker --. Column 4, line 14, "swilling" should read -- swelling --. Column 6, line 15, after "be" insert -- a --. Column 7, line 24, "simple" should read -- simply --; line 49, "of" should read -- or --. Column 10, line 1, "applications" should read -- application --. Column 12, line 44, "depliated" should read -- depilated --. Column 13, line 20, "prapartion" should read -- preparation --; line 23, "EXAMPLE VX" should read -- EXAMPLE XV --; line 26, "Preparation' should read -- Preparations --. Column 14, line 14, "washing" should read -- washings --; line 39, before "days" insert -- 2 --; line 52, "50 soap strokes and water rinse" should read -- 80 soap strokes and water rinse --; line 53, "8 minute soap scrub" should read -- 5 minute soap scrub --. Column 15, line 64, after "in" insert -- 1 --. Column 16, line 69, "is" should read -- it --.

Signed and sealed this 2nd day of June 1970.

(SEAL)
Attest:

EDWARD M. FLETCHER, JR.　　　　　　　　　WILLIAM E. SCHUYLER, JR.
Attesting Officer　　　　　　　　　　　　　Commissioner of Patents